G. B. REABEN.
TROLLEY RETRIEVER.
APPLICATION FILED NOV. 9, 1914.

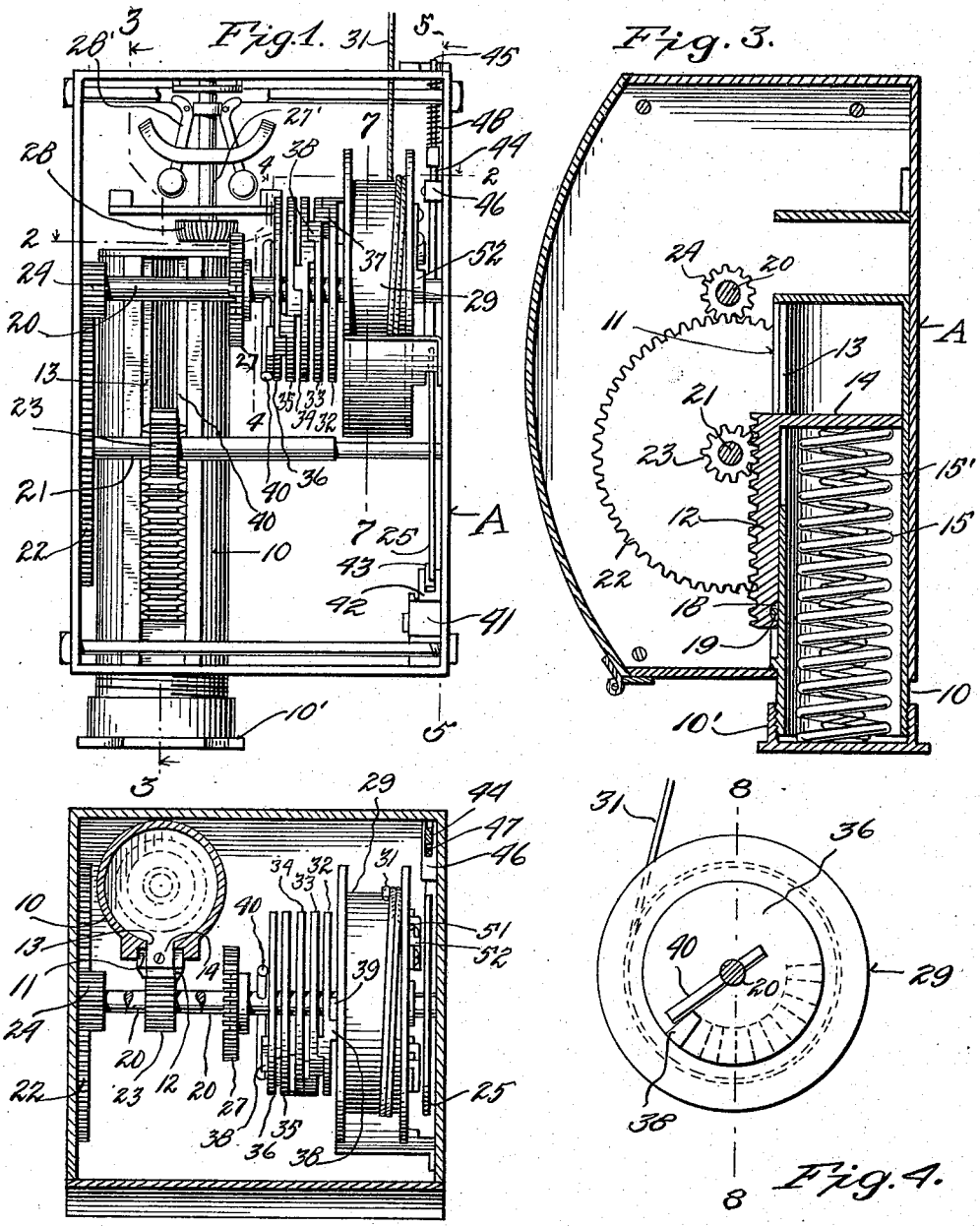

1,185,436.

Patented May 30, 1916.
2 SHEETS—SHEET 2.

Witnesses

Inventor
G. B. Reaben
By
Attorney

UNITED STATES PATENT OFFICE.

GEORGE B. REABEN, OF HATTIESBURG, MISSISSIPPI.

TROLLEY-RETRIEVER.

1,185,436.      Specification of Letters Patent.      Patented May 30, 1916.

Application filed November 9, 1914. Serial No. 871,073.

*To all whom it may concern:*

Be it known that I, GEORGE B. REABEN, a citizen of the United States, residing at Hattiesburg, in the county of Forrest, State of Mississippi, have invented certain new and useful Improvements in Trolley-Retrievers; and I do hereby declare the following to be a full, clear, and exact description of the invention, such as will enable others skilled in the art to which it appertains to make and use the same.

This invention relates to trolley retrievers and is intended particularly as an improvement on the trolley retriever described and claimed in my pending application filed January 30, 1914, and serially numbered 815456.

The object of the invention resides in the provision of a device of this character which will permit the necessary movement of the trolley in the normal operation of the latter but at the same time will automatically operate to move the trolley to lowered position when the latter becomes disengaged from the trolley wire whereby possibility of damage to the trolley pole and to the trolley wire and its supporting structure is obviated.

A further object of the invention resides in the provision of a trolley retriever in which the tripping device for releasing the retrieving mechanism is disposed in operative position by centrifugal force incident to the rotation of the winding drum arising when the trolley becomes disengaged from the trolley wire.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 5:
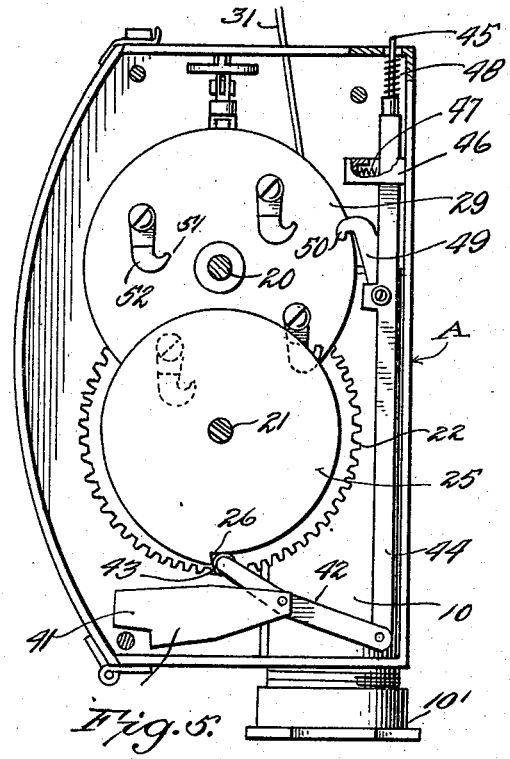
Figure 6:
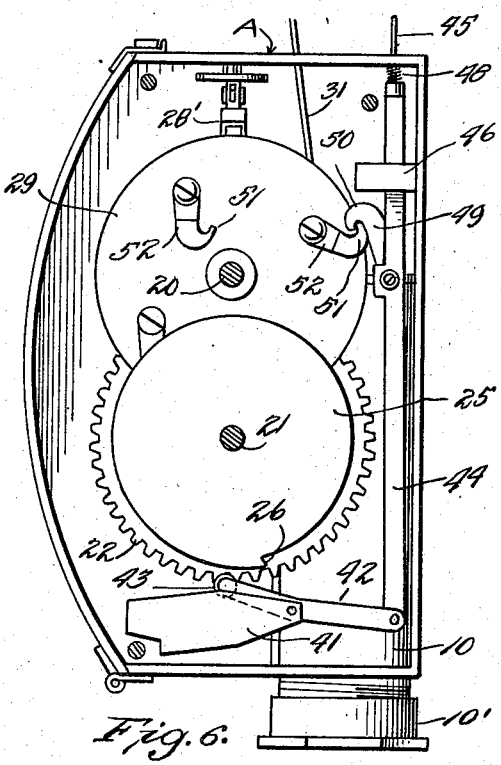
Figure 7:
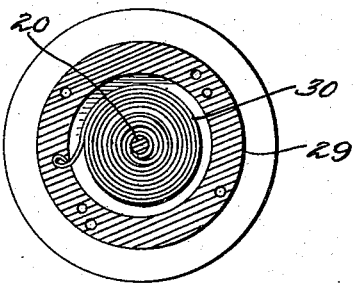
Figure 8:
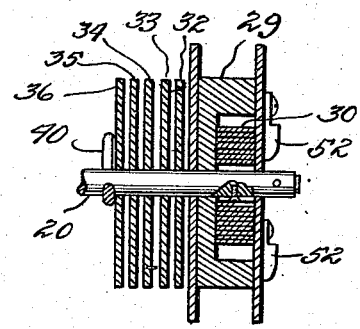
Figure 9:

Figure 1 is a view in elevation of the device with the front of the casing removed and the retrieving mechanism in set position; Fig. 2, a section on the line 2—2 of Fig. 1; Fig. 3, a section on the line 3—3 of Fig. 1; Fig. 4, a section on the line 4—4 of Fig. 1; Fig. 5, a side view of the invention with a side wall of the casing removed and the parts of the retrieving mechanism in set position; Fig. 6, a view similar to Fig. 5, the retrieving mechanism being shown tripped; Fig. 7, a section on the line 7—7 of Fig. 1; Fig. 8, a section on the line 8—8 of Fig. 4; and Fig. 9, a view showing the adjustable mounting of the trip arm of the device.

Referring to the drawings the invention is shown as comprising a casing A which is adapted to be secured to either dash of a trolley car in any suitable manner and may be constructed of any desired material. Mounted upon the inner side of the wall of the casing A which is secured next to the dash is a barrel or cylinder 10 on which is formed a guide-way 11 having slidably mounted therein a rack bar 12. The lower end of the cylinder 10 projects through the bottom of the casing A and has adjustably threaded thereon a cap 10'. The cylinder 10 is slotted at the base of the guide-way 11 as at 13 and the rack bar 12 is provided with a lateral extension 14 which projects through the slot 13 into the cylinder. Disposed within the cylinder 10 are springs 15 and 15' the upper ends of which abut the extension 14. The lower ends of the springs 15 and 15' abut the cap 10' and the tension of said springs may be varied by adjusting said cap. The underside of the rack bar 12 is transversely recessed as at 18 and mounted in this recess is a roller bearing 19 which engages the base of the guide-way 11 and facilitates the easy movement of the rack bar in said guide-way.

Rotatably mounted in the side walls of the casing A are upper and lower shafts 20 and 21 respectively. Fixed on the lower shaft 21 is a gear 22 and a pinion 23, the latter meshing with the rack bar 12. Fixed on the upper shaft 20 is a gear 24 which meshes with the gear 22 whereby rotation of the shaft 21 will effect rotation of the shaft 20. Fixed on the end of the shaft 21 remote from the gear 22 is a disk 25 provided with a notch or recess 26 in the periphery thereof. Also fixed on the shaft 20 is a gear 27 which meshes with a gear 28 fixed on the lower end of a vertical shaft 27', said vertical shaft having associated therewith a governor mechanism 28' for controlling the rotation of the shaft 27' and in turn controlling the rotation of the shafts 20 and 21.

Loosely mounted on the shaft 20 is a hollow drum 29 and confined within this drum is a spiral spring 30 one end of which is anchored to the shaft 20 and the other end to the drum, said spring being adapted to be wound up by rotation of the drum in one direction as will be obvious. Wound upon the drum 29 is a trolley rope 31 which extends through a suitable opening in the top of the casing A. Also loosely mounted upon the shaft 20 is a plurality of disks 32, 33, 34, 35 and 36 each of which is provided with oppositely disposed laterally directed lugs 37 and 38. Formed on the side of the drum 29 adjacent the disk 32 is a lateral lug 39 which is adapted to coöperate with the lug 37 on the disk 32. Likewise the lug 38 on the disk 32 is adapted to coöperate with the lug 37 on the disk 33, while the lugs 38 on the disks 33, 34 and 35 are adapted to coöperate with the lugs 37 on the disks 34, 35 and 36 respectively. The lug 38 on the disk 36 is adapted to coöperate with an arm 40 fixed to the shaft 20 between the gear 27 and the disk 36.

Secured to the side of the casing A adjacent the drum 29 is a bracket 41 to which is pivoted a trigger arm 42 having mounted on one end thereof a roller 43 engageable in the notch 26 to lock the shaft 21 against rotation in one direction. Pivotally connected to the other end of the trigger arm 42 is a bar 44 extending contiguous with the rear wall of the casing A and having a reduced upper end portion 45 working through a suitable opening in the top of said casing. Secured to the rear wall of the casing A is a U-shaped member 46 which embraces the bar 44 and carries a spring 47 which engages the bar 44 and yieldingly holds the upper portion thereof against movement in the direction of the drum 29. A spring 48 encircles the upper end of the bar 44 and constantly tends to force said bar longitudinally toward the bottom of the casing A to hold the roller 43 engaged in the notch 26. Adjustably mounted on the bar 44 is a trip arm 49 having a hook terminal 50 adapted to coöperate with the hook terminals 51 of trip arms 52 pivotally mounted upon the adjacent side of the drum 29. The pivot of the arms 52 is so positioned that under normal rotation of the drum 29 as a result of paying out of the trolley rope insufficient centrifugal force will be produced to throw the arms 52 into engaging position with respect to the arm 49. However when the trolley becomes disengaged from the trolley wire the resulting rotation of the drum 29 will be of such rapidity that ample centrifugal force will arise to throw the arms 52 into engaging position with respect to the arm 49 so that one of the arms 52 will engage the arm 49 as shown in Fig. 6 and move the bar 44 longitudinally so as to disengage the roller 43 from the notch 26 and thus release the retrieving mechanism.

Assuming the parts to be in the position shown in Figs. 1, 3 and 6 it will be obvious that the springs 15 and 15' will be compressed and the shafts 20 and 21 locked against rotation by engagement of the roller 43 in the notch 26. During normal upward movement of the trolley the drum 29 will be rotated and the spring 30 wound up so that when a normal downward movement of the trolley takes place the drum 29 will be rotated in the opposite direction to take up slack in the trolley rope 31. In paying out the trolley rope 31 under normal upward movement of the trolley the drum 29 is capable of six complete revolutions. The first complete revolution of the drum will bring the lug 39 of the drum into engagement with the lug 37 of the disk 32. The second complete revolution of the drum will bring the lug 38 of the disk 32 into engagement with the lug 37 of the disk 33 and so on until the lugs 38 of the disks 33, 34 and 35 have been brought into engagement with the lugs 37 of the disks 34, 35 and 36 respectively. The sixth revolution of the drum 29 will bring the lug 38 of the disk 36 into engagement with the arm 40. This free rotation of the drum 29 is ample to effect the necessary paying out of the trolley rope during normal operation. When the trolley pole is disengaged from the trolley wire the rotation of the drum 29 is sufficiently rapid to throw the arms 52 in position to engage the arm 49 and when such engagement takes place the roller 43 will be disengaged from the notch 26. When the disk 25 is thus released the springs 15 and 15' will expand and move the rack 12 upwardly. This movement of the rack 12 will rotate the shafts 21 and 20 and the rotation of the last named shaft will be transmitted to the drum 29 to wind up the trolley rope 31 through the medium of the arm 40, and lugs 37 and 38 on the disks 32, 33, 34, 35 and 36 and the lug 39 on the drum 29. To reset the device it is only necessary to unwind the trolley rope 31 from the drum 29 until said drum has been rotated in excess of six revolutions. Such excess rotation of the drum 29 will be transmitted to the shafts 20 and 21 through the arm 40 and the rotation of the shaft 21 under such conditions will move the rack 12 downwardly and rotate the disk 25 until the roller 43 is engaged in the notch 26 to lock the mechanism set.

What is claimed is:—

1. In a trolley retriever, the combination of a support, a shaft rotatably mounted on said support, a drum loosely mounted on the shaft, a trolley rope wound on said drum, means for locking the drum to the shaft for rotation with the latter when said shaft is rotated in one direction, normally restrained means for rotating said shaft in a direction to effect rotation of the drum, and centrifugally controlled means for releasing the normally restrained means to rotate said shaft.

2. In a trolley retriever, the combination of a support, a shaft rotatably mounted on said support, a drum loosely mounted on said shaft, a trolley rope wound upon said drum, means for locking the drum to the shaft for rotation with the latter when said shaft is rotated in one direction, means constantly tending to rotate the shaft in a direction to impart winding movement to the drum, a locking device for locking said means inactive, and centrifugally operated means carried by the drum for releasing said locking device and effecting rotation of the shaft to impart winding rotation to the drum.

3. In a trolley retriever, the combination of a support, a shaft rotatably mounted on said support, a drum loosely mounted on said shaft, a trolley rope wound upon said drum, means for locking the drum to the shaft for rotation with the latter when said shaft is rotated in one direction, means constantly tending to rotate the shaft in a direction to impart winding movement to the drum, a locking device for locking said means inactive, and arms pivoted on the drum adapted to engage and release said locking device during unwinding rotation of the drum when said arms have assumed a predetermined position under the influence of centrifugal force.

4. In a trolley retriever, the combination of a support, a shaft rotatably mounted on said support, a drum loosely mounted on said shaft, a trolley rope wound upon said drum, means for locking the drum to the shaft for rotation with the latter when said shaft is rotated in one direction, means constantly tending to rotate the shaft to impart winding movement to the drum, a locking lever pivoted on the support and engageable with the means tending to rotate the shaft in a direction to impart winding movement to the drum, a rod mounted on the support and connected to the lever, spring means normally holding said rod in position to dispose the locking lever in locked position, a trip arm on said rod, and arms pivoted on the drum and adapted to engage the trip arm on the rod to move the latter and operate the lever to unlocked position during unwinding rotation of the drum when said arms have assumed a predetermined position under the influence of centrifugal force.

In testimony whereof, I affix my signature, in the presence of two witnesses.

GEORGE B. REABEN.

Witnesses:
W. A. COLLINS,
N. R. McCULLOUGH.

Copies of this patent may be obtained for five cents each, by addressing the "Commissioner of Patents. Washington, D. C."